United States Patent
Bertola et al.

(10) Patent No.: US 12,134,120 B2
(45) Date of Patent: Nov. 5, 2024

(54) METHOD FOR OBTAINING FACE TEETH ON AN INNER RING OF A WHEEL HUB AND ASSOCIATED TOOL

(71) Applicant: AKTIEBOLAGET SKF, Gothenburg (SE)

(72) Inventors: Maurizio Bertola, Piscina (IT); Fulvio Carlo Nicastri, Garzigliana (IT); Paolo A Re, Nichelino (IT)

(73) Assignee: AKTIEBOLAGET SKF (SE)

( * ) Notice: Subject to any disclaimer, the term of this patent is extended or adjusted under 35 U.S.C. 154(b) by 349 days.

(21) Appl. No.: 17/586,843

(22) Filed: Jan. 28, 2022

(65) Prior Publication Data

US 2022/0241844 A1 Aug. 4, 2022

(30) Foreign Application Priority Data

Feb. 3, 2021 (IT) .......................... 102021000002189

(51) Int. Cl.
*B21K 1/30* (2006.01)
*B21D 53/26* (2006.01)
(Continued)

(52) U.S. Cl.
CPC .............. *B21K 1/30* (2013.01); *B21D 53/265* (2013.01); *B21J 5/12* (2013.01); *B21J 9/025* (2013.01); *F16D 1/10* (2013.01)

(58) Field of Classification Search
CPC .......... B21D 53/265; B21K 1/30; B21K 1/40; B21K 21/12; B21J 5/12; B21J 13/02
See application file for complete search history.

(56) References Cited

U.S. PATENT DOCUMENTS

| 4,893,960 A | 1/1990 | Beier et al. |
| 2013/0174422 A1* | 7/2013 | Bosco ..................... B21J 5/008 29/894.361 |

(Continued)

FOREIGN PATENT DOCUMENTS

| CN | 102896260 | 5/2016 |
| EP | 2551031 | 1/2013 |

(Continued)

OTHER PUBLICATIONS

Search Report for corresponding Italian Patent Application No. 102021000002189 dated Oct. 21, 2021.

*Primary Examiner* — Debra M Sullivan
(74) *Attorney, Agent, or Firm* — Reed Smith LLP

(57) ABSTRACT

A method and tool for obtaining face teeth having a plurality of radial teeth on an annular collar of an inner ring of a wheel hub; in which annular roughed-out face teeth are first formed on the collar coaxial with an axis of symmetry (A) of the collar and having a plurality of radial first teeth arranged in a crown and alternating at constant pitch with a plurality of radial first concavities; then a shaping tool comprising a pressing head provided with annular calibration face teeth is axially pressed onto the collar to engage with the annular roughed-out face teeth, second radial concavities of the annular calibration teeth each being delimited by a bottom wall having a rounded circumferential profile exactly reproducing in negative the rounded circumferential profile of the tips or ridges of the radial teeth of the required face teeth.

18 Claims, 2 Drawing Sheets

(51) Int. Cl.
*B21J 5/12* (2006.01)
*B21J 9/02* (2006.01)
*F16D 1/10* (2006.01)

(56) References Cited

U.S. PATENT DOCUMENTS

| | | | |
|---|---|---|---|
| 2013/0181375 A1* | 7/2013 | Ferrero | B29D 99/0032 |
| | | | 264/293 |
| 2013/0181376 A1 | 7/2013 | Morello et al. | |
| 2013/0181504 A1 | 7/2013 | Alessandro et al. | |

FOREIGN PATENT DOCUMENTS

| | | |
|---|---|---|
| EP | 2551033 | 1/2013 |
| EP | 2551034 | 1/2013 |
| JP | 2012223803 | 11/2012 |

* cited by examiner

METHOD FOR OBTAINING FACE TEETH ON AN INNER RING OF A WHEEL HUB AND ASSOCIATED TOOL

CROSS-REFERENCE RELATED APPLICATION

This application is based on and claims priority to Italian Patent Application No. 10202000002189 filed on Feb. 3, 2021, under 35 U.S.C. § 119, the disclosure of which is incorporated by reference herein.

FIELD

The present disclosure relates to a method and device for obtaining face teeth on an inner ring of a wheel hub through plastic deformation.

BACKGROUND

In wheel hubs, face teeth are intended to form a head-to-head coupling between a ring of a wheel hub and corresponding face teeth of a ring of a constant velocity joint.

BRIEF DESCRIPTION OF THE DRAWINGS

Further features and advantages of embodiments in accordance with the present disclosure will become clear from the following description, made with reference to the figures in the accompanying drawings, in which.

DETAILED DESCRIPTION

Figure 2:
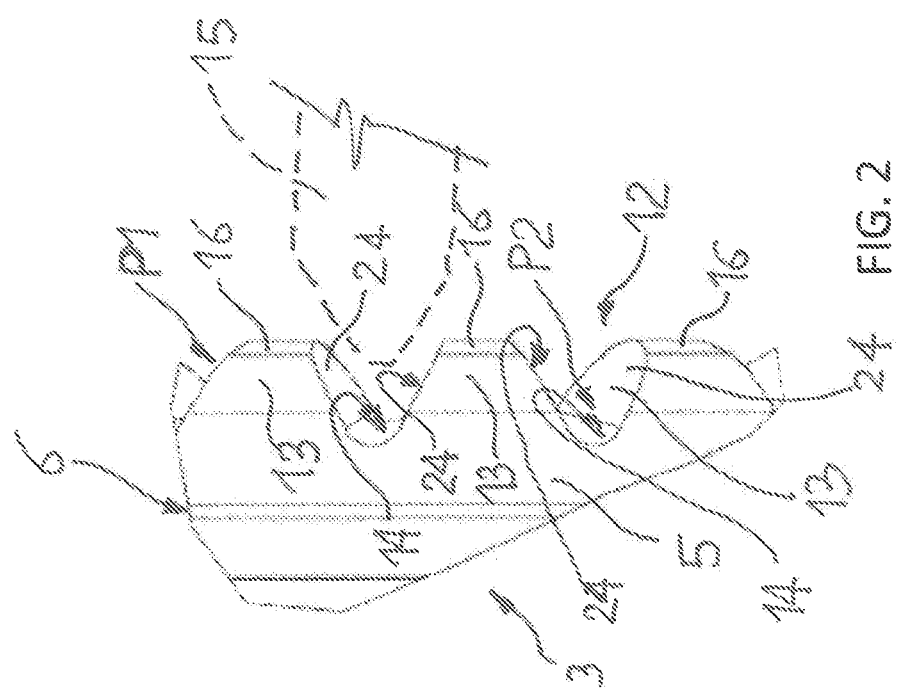
FIG. 2 illustrates various exemplary embodiments on an enlarged scale according to this disclosure.
Figure 1:
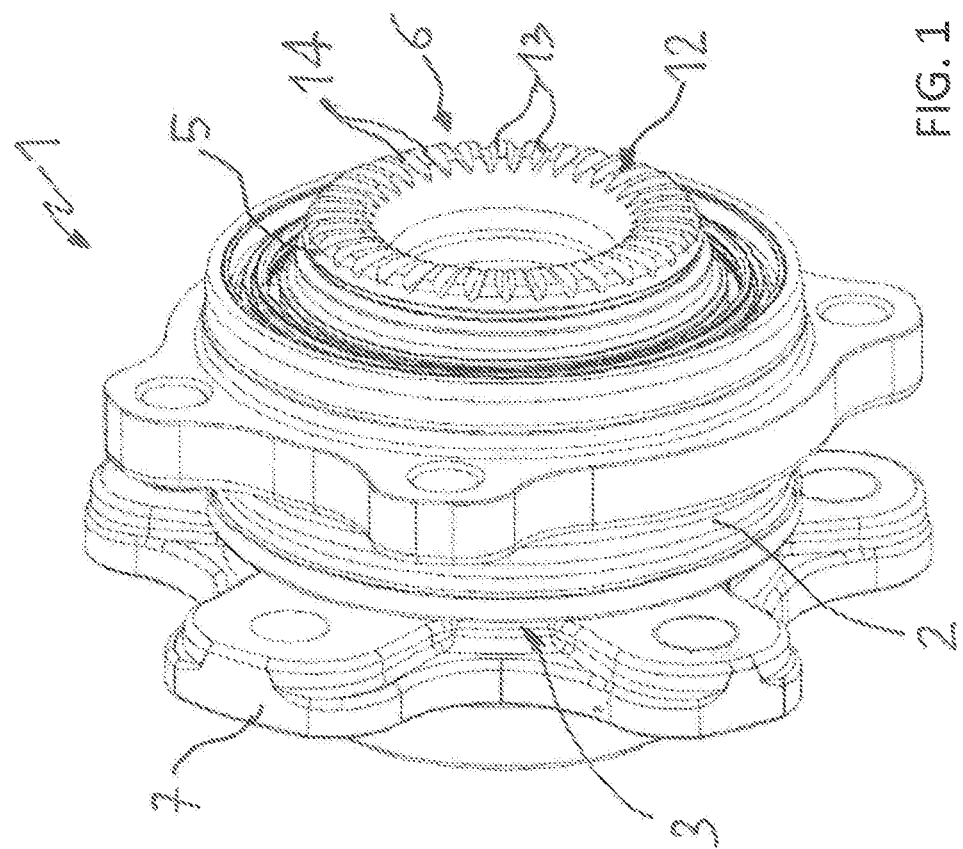
FIG. 1 illustrates various exemplary embodiments of a wheel hub shown in a rear three-quarter perspective view according to this disclosure.

Wheel hubs in accordance with this disclosure include face teeth that are intended to form a head-to-head coupling between an inner ring of the wheel hub and corresponding face teeth of an outer ring of a constant velocity joint. This coupling ensures that torque is transmitted from the constant velocity joint to an inner ring of a wheel hub on which a wheel is mounted through a flanged end, e.g., of a vehicle.

A shaping method such as that described in U.S. Pat. No. 4,893,960 requires the use of a relatively complex tool and, above all, do not allow gears having the characteristics of a highly constant tooth profile. Such a constant tooth profile is necessary in modern applications because of the increasingly high torques that are transmitted.

Attempts at addressing this problem, such as EP2551034B1 fail to fully achieve correct shaping of teeth. This is particularly the case with regard to shapes of tips or ridges of such teeth, which are instead flattened.

Such solutions fail to deliver the required torques that need to be transmitted and lead to incorrect tooth-on-tooth assembly between wheel hub and constant velocity joint during assembly. Such solutions result in opposing teeth of two components that do not engage correctly during coupling. In use, when such teeth finally do click into the correct position under operating torque forces, a corresponding central screw or nut used to lock the two components together immediately loses the clamping force that is imparted at assembly. This causes face play between the two paired teeth of the wheel hub and constant velocity joint. While this play may not cause torque transmission to fail in all cases, it does cause undesirable noise from the shaft due to the teeth jumping out of the correct engagement position when higher torques are transmitted.

Finally, in a vehicle in which this condition occurs, the teeth may also be gradually ground down, ultimately leading to total loss of traction in 2WD (two-wheel drive) vehicles or a partial loss of traction in AWD vehicles (with four drive wheels that do not always engage).

In both cases, this can in the long run cause gradual destruction of the gearbox if the driver does not detect the loss of power, as the vehicle's control unit will not detect faults in time because the axle without traction continues to provide a plausible ABS signal.

An object of the present disclosure is to provide techniques and tools for obtaining, through cold plastic deformation, face teeth on an inner ring of a wheel hub that are free from the deficiencies in the state of the art discussed above. In particular, an inner ring which has teeth having tips or crests that are completely and perfectly rounded, thus ensuring not only more precise tooth dimensions and tooth profiles of very constant dimensions and geometry, but also of solving the problem of flattening of the tips or crests of face teeth obtained by orbital moulding.

It is also an object of the present disclosure to provide a method and an associated tool for plastic deformation for forming face teeth on an inner ring of a wheel hub that will avoid any possible damage to the inner ring and/or other components of the wheel hub due to the forces exerted by the tool on the inner ring during the moulding operation.

With reference to FIGS. 1 to 4, a wheel hub indicated therein as a whole by 1.

In some embodiments in accordance with this disclosure, a wheel hub 1 may include an outer ring 2 intended when in use to be attached in a known manner to a suspension strut (not illustrated), e.g., of a vehicle, and an inner ring 3. Outer ring 2 and inner ring 3 may be rotatably coupled relative to each other by means of two crowns of rolling elements, for non-limiting example balls, which are known and for simplicity not illustrated, radially inserted between outer ring 2 and inner ring 3 and engaging appropriate annular tracks provided in outer ring 2 and inner ring 3, which are also known and for simplicity not illustrated. As illustrated in, e.g., FIG. 3, inner ring 3 passes radially within and through outer ring 2 exposing collar 5 on an end 6 of inner ring 3 distal from exemplary flange 7.

In use, an inner ring 3 may be operatively associated with a constant velocity joint, which is known and for simplicity not illustrated, by means of face teeth 4 (e.g., FIGS. 3 and 4) obtained in a manner disclosed herein on an annular collar 5 formed on a first extremity 6 of inner ring 3. Inner ring 3 may also be provided with a flange 7 for the attachment of a wheel of a vehicle on the side opposite to extremity 6.

Figure 3:
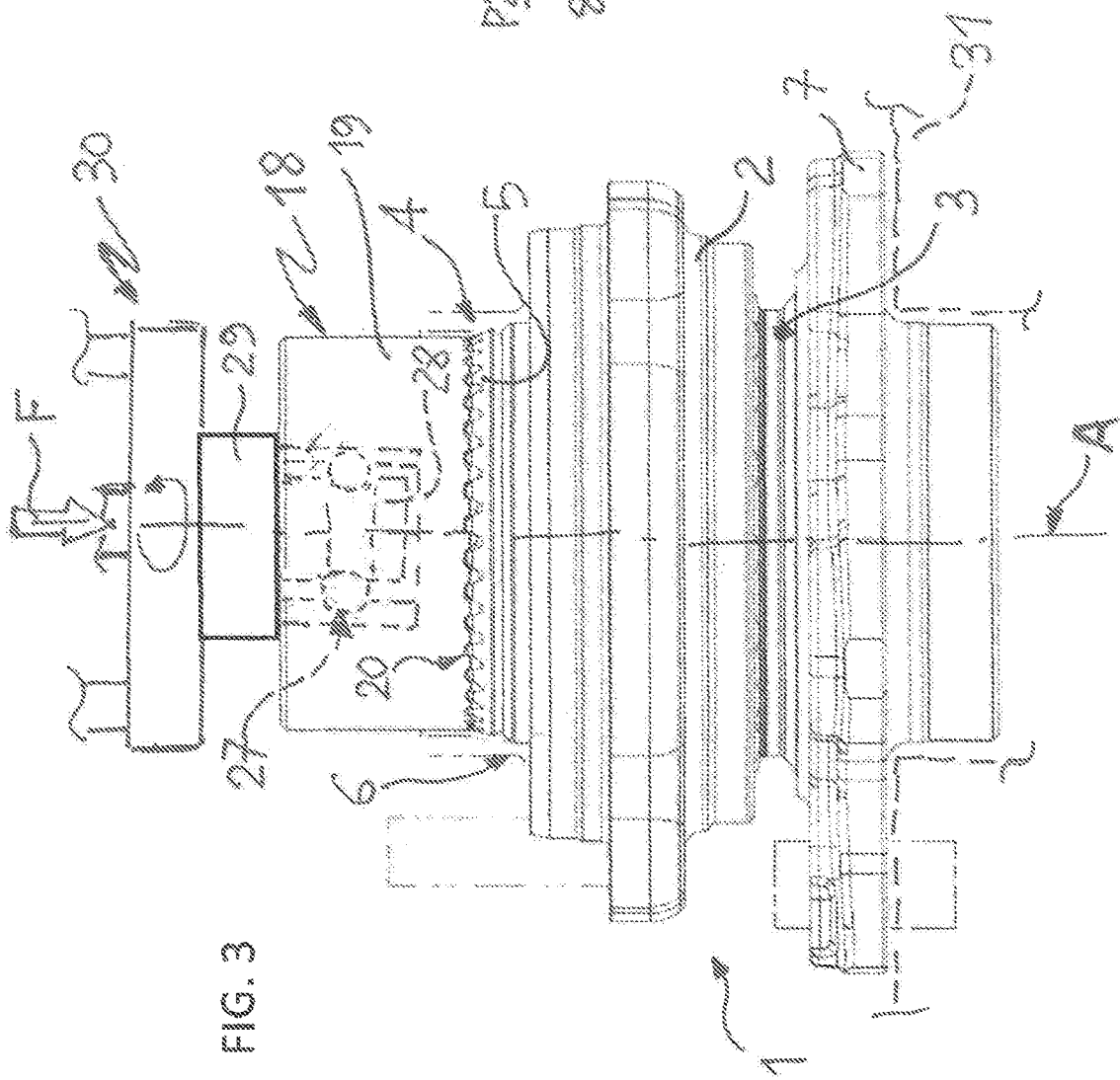
FIG. 3 illustrates a cross sectional view of various exemplary embodiments of a wheel hub in combination with an associated tool according to this disclosure.

Inner ring 3, outer ring 2, and annular collar 5 may be coaxial with each other, having a common axis of symmetry A which coincides with a general axis of symmetry B of the whole wheel hub 1 (e.g., FIG. 3).

Shaped annular collar 5 may include face teeth 4, which are formed on a front face of extremity 6 and are arranged substantially perpendicular to axis of symmetry B of wheel hub 1 and of axis A of inner ring 3, which axes typically coincide.

Figure 4:
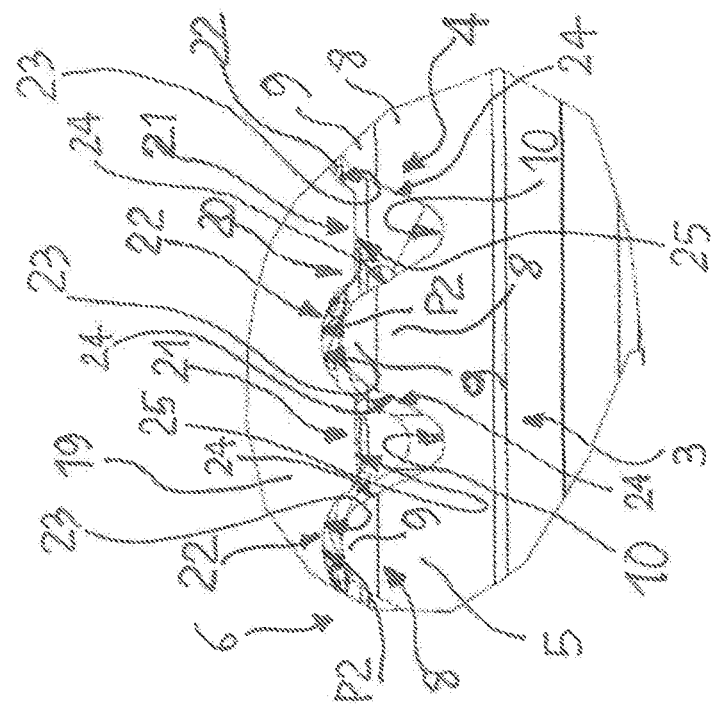
FIG. 4 illustrates various exemplary embodiments on an enlarged scale according to this disclosure.

In FIG. 4, face teeth 4 comprise a plurality of radial teeth 8 having ridges 9 with a rounded circumferential profile and a plurality of radial concavities 10, also having a rounded circumferential profile.

Through the geometry described, shaped collar 5 is obtained in a known manner by orbital moulding, which is a plastic deformation operation performed on terminal extremity 6 so as to impart a predetermined radial profile to annular collar 5 by means of a rotating tool having a precessional precise motion (which orbital forming of a collar, e.g., 5, from an extremity of bearing ring, e.g., 6, is known and for simplicity not illustrated).

Subsequently face teeth 4 are obtained by means of at least one step of cold plastic deformation of an annular collar 5 in order to press required face teeth 4 on such an annular collar 5 in a manner consistent with this disclosure. Thus, in accordance with this disclosure, a shaped annular collar 5 will be preformed on extremity 6 before face teeth 4 are obtained.

A first step in the moulding method according to this disclosure is performed subsequent to the preparatory operation or step of obtaining annular collar 5 and comprises a roughing step in which annular roughed-out face teeth 12 (e.g., FIGS. 1, 2) are formed on collar 5 by cold plastic deformation thereof.

Annular roughed-out face teeth 12 may be formed coaxially with axis of symmetry A of annular collar 5, which coincides with the axis of symmetry B of wheel hub 1. Annular roughed-out face teeth 12 may include a plurality of first radially extending teeth 13 arranged annularly (e.g. in a crown) that alternate with a plurality of first radially extending concavities 14 at constant pitch. Teeth 13 and concavities 14 may be formed to have circumferential profiles of a predetermined shape, such as P1 and P2, respectively (e.g. FIG. 2).

This first step of the method according to the invention may be performed by any known method of cold plastic deformation, using a tool 15, generically and only diagrammatically illustrated as dashed lines in FIG. 2, which may be of a great variety of types. For example, the first step of the invention is performed by operating as described in any one of the following documents, the necessary parts of the contents of which are incorporated herein by reference as if fully set forth herein: EP2551034B1, EP2551031, US2013181375, US2013181376, US20130181504.

In some embodiments of the present disclosure, radial teeth 13 may be provided with tips or ridges 16 having a substantially flat circumferential profile. Radial concavities 14 may be formed so as to have a rounded circumferential profile, in particular in relation to their bottom walls, which may be substantially identical to a rounded circumferential profile of radial concavities 10 of face teeth 4.

This result, which is moreover similar to that which can in any event be achieved by applying one of the methods described in EP2551034B1, EP2551031, US2013181375, US2013181376, and US20130181504 to preformed annular collar 5, is achieved by pressing tool 15 against collar 5 according to one of the methods described in any of the above-mentioned documents, but modified by applying a pressing force on tool 15 (against collar 5) which is less than that required to obtain final, finished, face teeth 4. In this way, any risk of damage to tool 15 and/or wheel hub 1 (or any of its components) is avoided, while obtaining roughed-out teeth 12 which are substantially similar to required teeth 4, but differ by have individual teeth bodies 13 with ridges that are flattened, or at least more flattened than those that finished teeth 4 that are required to transfer anticipated torque forces.

In accordance with an exemplary embodiment of this disclosure, once a first step of plastic deformation is completed then roughed-out face teeth 12, which are similar to a plurality of required teeth 4, but not yet provided with the necessary dimensional and shape characteristics of required teeth 4, have been produced. These intermediately formed face-teeth, e.g., 12, may be referred to as rough-outs of final finished required teeth 4.

A second step in the method according to an exemplary embodiment of the present disclosure may be performed on a collar 5 provided with roughed-out annular teeth 12. A second step may include a calibration step. The calibration step may employ a shaping tool 18, which may include a pressing head 19 provided with frontally located annular calibration teeth 20.

In a calibration step in accordance with this disclosure, shaping tool 18 may be axially pressed against an annular collar 5 on a side of annular roughed-out face teeth 12 with a predetermined axial force F (e.g., FIGS. 3, 4) in a direction substantially parallel to axes A & B.

Annular calibration teeth 20 may be configured to engage with roughed-out face teeth 12 and may be pressed against annular collar 5 while remaining coaxial with axis of symmetry A of annular collar 5, as is illustrated in FIG. 3.

In at least one embodiment, annular calibration teeth 20 of pressing head 19 are configured to include a plurality of second radially extending teeth 21 (e.g., FIG. 4) arranged annularly (e.g. in a crown) and alternating at constant pitch with a plurality of second radially extending concavities 22.

Radial concavities 22 may each be further delimited by a bottom wall 23 having a rounded circumferential profile which reproduces in negative exactly the rounded circumferential design profile of ridges 9 of a plurality of finished radial teeth 8 of required face teeth 4. Each bottom wall 23 may, in other words, defines a shape that is substantially the same as a ridge 9 of a finished individual tooth 8.

Second radial teeth 21 of calibration teeth 20 may be configured (e.g., FIG. 4) to act together in contact during a calibration step in accordance with this disclosure, against respective opposite flanks 24 of first radial teeth 13 of annular roughed-out face teeth 12 and consequently press against the same with sufficient force to make some of the metal material of which first radial teeth 13 are made flow by plastic deformation into second radial concavities 22 of calibration teeth 20 carried by pressing head 19, as illustrated diagrammatically by the dashed lines in FIG. 4, even though only pictorially and without any claim to verisimilitude.

During a second step of the method in accordance with this disclosure, some of a material (e.g. metal) of a plurality of first radial teeth 13 may be plastically deformed in a controlled manner. A thrust exerted by an axial force F of shaping tool 18 is made to flow against a plurality of rounded bottom walls 23 of concavities 22 of calibration teeth 20 carried by shaping tool 18, thus producing perfectly rounded ridges 9 as intended. A thrust simultaneously causes all other dimensional and shape characteristics of roughed-out teeth 12 previously obtained in a plastic deformation step to take on intended design values and shape required for a finished face teeth 4. Thus through a single operation, all of roughed-out teeth 12 may be transformed into finished face teeth 4 having perfectly rounded ridges 9. In various embodiments, by virtue of a second step, rounded ridges 9 comprise a shaped plastically deformed metal material.

In a preferred embodiment, second radial teeth 21 of calibration teeth 20 may be made so as to be delimited by ridges 25 (e.g., FIG. 4) having a substantially flat circumferential profile on a side opposite to concavities 22.

Second radial teeth 21 of calibration teeth 20 may have an axial length that is less than an axial length of first radial teeth 13 of roughed out face teeth 12.

According to another embodiment in accordance with the present disclosure, during a calibration step, a pressing head 19 is supported by a shaping tool 18 in an idling manner, so that pressing head 19 may rotate about axis A and with respect to annular roughed-out face teeth 12 on an annular collar 5.

In essence, a second step of the method according to this disclosure includes a single operation of pressing a shaping tool 18 against annular roughed-out face teeth 12 to permanently create required face teeth 4 all together at the same time, with ridges 9 of radial teeth 4 thereof perfectly rounded as a result.

From what has been described so far, it is clear that various embodiments in accordance with this disclosure include a shaping tool, e.g. shaping tool 18, to obtain face teeth 4 on an inner ring 3 of a wheel hub 1, in which the face teeth comprise a plurality of individual radial teeth 8 having tips or ridges 9 with a rounded circumferential profile alternating with a plurality of concavities 10.

A shaping tool 18 in accordance with an exemplary embodiment of the present disclosure may be configured to be used on an inner ring 3 having an annular collar 5 of a predetermined radial profile, preferably formed by plastic deformation, at a first extremity 6 thereof.

A shaping tool 18 may include a pressing head 19 provided frontally with annular calibration teeth 20, which according to the invention is configured to be able to engage with annular roughed-out face teeth 12 previously created on an annular collar 5 by cold plastic deformation of collar 5 itself, obtained in any suitable way.

Annular calibration teeth 20 of pressing head 19 may include a plurality of radial teeth 21 arranged annularly (e.g. in a crown) alternating at constant pitch with a plurality of radial concavities 22, each delimited by a bottom wall 23 with a rounded circumferential profile which, in accordance with this disclosure, exactly reproduces in negative a rounded circumferential profile P2 of ridges 9 of a plurality of radial teeth 8 of required face teeth 4.

In some embodiments, shaping tool 18 may carry pressing head 19 in an idling manner, so that pressing head 19 is free to rotate about axis A relative to shaping tool 18 and annular roughed-out face teeth 12 on an annular collar 5 of an outer ring 3.

According to an exemplary embodiment of the present disclosure, pressing head 19 may be mounted in an idling manner by means of a rolling bearing 27, on a shank or shaft 28 of one piece with a plate 29 forming part of tool 18, together with shank 28, bearing 27 and pressing head 19.

A plate 29 in accordance with this disclosure may be configured to act together, when in use, with a press 30 of any known type (for simplicity, not illustrated in detail) which in use provides a force F to a press tool 18 against a wheel hub 1 immovably mounted on a base 31 (illustrated as dashed lines in, e.g., FIG. 3) and coaxially with axis A, so as to cause calibration teeth 20 to engage with roughed-out teeth 12 and subsequently press calibration teeth 20 with controlled pressure against roughed-out teeth 12 to change and complete the shape of a plurality of first radial teeth 13 and "convert" them into finished teeth 8.

In some preferred embodiments, pressing head 19 may rotate in relation to an inner ring 3 and an associated collar 5, as this allows teeth 20 to engage with roughed out teeth 12, which are a rough-out of required face teeth 4, smoothly and without producing undesirable stresses.

Roughed-out face teeth 12 may be obtained with their concavities 14 already identical in shape and size to concavities 10 of required face teeth 4.

In some embodiments, radial teeth 21 of annular calibration teeth 20 may be configured so that when in use, they act together in pressing against respective opposite sides 24 of respective adjacent pairs of radial teeth 13 of annular roughed-out face teeth 12 previously formed on collar 5 to cause some metal material of said radial teeth 13 of annular roughed-out face teeth 12 to flow within radial concavities 22 of calibration teeth 20 by plastic deformation and against rounded bottom walls 23 thereof.

In an embodiment in which concavities 14 of roughed-out face teeth 12 are already formed identical to concavities 10 of required teeth 4, ridges 25 of radial teeth 21 of calibration teeth 20 may have a substantially flat circumferential profile and an axial length, measured parallel to the axis of symmetry A of annular collar 5, which is less than heighten axial length, measured again parallel to axis of symmetry A, of radial concavities 10 of required face teeth 4.

In this way, radial concavities 14 of roughed-out face teeth 12, which are already formed identical to concavities 10 of required face teeth 4, are not affected by the second plastic deformation step performed by tool 18, which therefore leaves them unchanged and thus conforming to the design of face teeth 4.

Obviously, if in the second step it were also necessary to calibrate the final size/shape of concavities 10 because concavities 14 did not already fully conform to concavities 10 of required teeth 4, teeth 21 may have to be configured to be as tall as the depth of required concavities 10, and therefore of the same or greater height than that of concavities 14, and with ridges 25 rounded, rather than flat.

In various embodiments, a wheel hub in which an inner ring forms a spindle having a first flanged end and a second end, opposite the first end, and includes a recessed collar configured through impression and subsequent plastic deformation to receive face teeth needed for a mechanical connection to and receipt of transmission of motion from a constant velocity joint forming part of a transmission system of, e.g., a vehicle.

On the basis of what has been described it is clear that the invention introduces a further calibration step after the step (according to the various methods known in the art) of indenting face teeth on collar 5. Since required teeth 4 are preformed, consisting of roughed-out teeth 12 already similar to teeth 12 but not yet having all the necessary characteristics, the amount of force required to obtain these characteristics will only be that necessary to move material from the tips 16 of teeth 13 into concavities 22 until they are completely filled. In this way, a round shape is obtained for tips 9 of teeth 8 by applying a force which is less than the force that would be required to form teeth 8 directly in their final round shape. By using a single tool that deforms all the teeth in a single operation, calibration ensures precise circumferential spacing.

The use of an axial tool such as tool 18 requires a simple press with no moving parts.

The two-step process allows less force to be applied at each step, requiring simpler and cheaper tools or providing longer tool life.

The addition of a calibration tool means that there will be little or no change in the known state-of-the-art processes currently in use, thus minimizing the need for redesign or development.

Developing the method for implementation on a variety of projects will require small investment and low complexity of design.

We claim:

1. A method for obtaining a plurality of finished teeth, the method comprising:
   forming, on an annular collar of an inner ring of a wheel hub, a plurality of annular roughed-out teeth comprising a plurality of first radially extending teeth arranged annularly and a plurality of first radial concavities alternating annularly with the plurality of first radially extending teeth, wherein the plurality of annular rouged-out teeth are formed coaxial with an axis of symmetry (A) of the annular collar, wherein the axis A coincides with an axis of symmetry (B) of the wheel hub; and
   calibrating the plurality of annular roughed-out teeth with a shaping tool, the shaping tool comprising a pressing head comprising a plurality of annular calibration teeth, wherein calibrating the plurality of annular roughed-out teeth comprises:
      pressing the shaping tool against the plurality of annular roughed-out teeth of the annular collar with a predetermined axial force (F), thereby engaging the plurality of annular calibration teeth with the plurality of annular roughed-out teeth to form the plurality of finished teeth,
   wherein the pressing head is coaxial with the axis (A) when pressed against the annular collar;
   wherein the plurality of annular calibration teeth of the pressing head comprise:
      a plurality of second radial teeth arranged annularly; and
      a plurality of second radial concavities alternating annularly with the plurality of second radial teeth, the plurality of second radial concavities delimited by a plurality of bottom walls, each bottom wall comprising a respective second rounded circumferential profile,
   wherein the plurality of finished teeth comprise:
      a plurality of third radially extending teeth comprising a plurality of ridges comprising a respective first rounded circumferential profile; and
      a plurality of third concavities alternating annularly with the plurality of third radially extending teeth, wherein each respective first rounded circumferential profile is defined by each respective second rounded circumferential profile.

2. The method of claim 1, wherein the plurality of first radially extending teeth comprise a flat circumferential profile.

3. The method of claim 2, wherein each of the plurality of first radial concavities comprise a respective third rounded circumferential profile identical to each respective first rounded circumferential profile.

4. The method of claim 3, wherein,
   the first radially extending teeth comprise a metal material, and
   pressing the shaping tool against the plurality of annular roughed-out face teeth causes at least a portion of the metal material of the first radially extending teeth to flow into the plurality of second radial concavities of the plurality of annular calibration teeth of the pressing head.

5. The method of claim 2, wherein the plurality of second radial teeth comprise a plurality of ridges, wherein each ridge comprises a flat circumferential profile.

6. The method of claim 1, wherein,
   the first radially extending teeth comprise a metal material, and
   pressing the shaping tool against the plurality of annular roughed-out teeth causes at least a portion of the metal material of the first radially extending teeth to flow into the plurality of second radial concavities of the plurality of annular calibration teeth of the pressing head.

7. The method of claim 1, wherein the plurality of second radial teeth comprise a flat circumferential profile.

8. The method of claim 7, wherein the plurality of second radial teeth comprise an axial height less than an axial height of the plurality of first radially extending teeth.

9. The method of claim 1, wherein the pressing head is idly supported by the shaping tool such that the pressing head rotates about axis (A) with respect to the annular roughed-out face teeth.

10. The method of claim 1, wherein the predetermined axial force (F) is parallel to the axis (A).

11. The method of claim 1, wherein the shaping tool further comprises:
    a plate;
    a shaft extending axially from the plate; and
    a rolling bearing mounting the pressing head on the shaft.

12. The method of claim 1, wherein an axial height of the plurality of second radial teeth is equal to an axial depth of the plurality of third radial concavities.

13. A shaping tool comprising:
    a plate;
    a shaft extending axially from the plate;
    a rolling bearing connected to the shaft; and
    a pressing head mounted on the shaft by means of the rolling bearing, the pressing head comprising a plurality of annular calibration teeth, the plurality of annular calibration teeth comprising:
       a plurality of radial teeth arranged annularly about an axis of symmetry (A) of the shaping tool;
       a plurality of radial concavities alternating annularly with the plurality of radial teeth,
    wherein each of the plurality of radial concavities is delimited by a plurality of bottom walls having a firs rounded circumferential profile.

14. The shaping tool of claim 13, wherein the pressing head is rotatable about the axis (A) relative to the shaping tool and is configured to be rotatable about an annular collar of an inner ring of a bearing unit.

15. The shaping tool of claim 13, wherein the plurality of radial teeth of the annular calibration teeth are configured to:
    press against respective opposite flanks of an adjacent plurality of radial teeth of a plurality of annular roughed-out teeth of an annular collar comprising a metal material, and
    cause the metal material of the plurality of annular roughed-out teeth flow into the plurality of radial concavities of the plurality of annular calibration teeth and against each of the plurality of bottom walls.

16. The shaping tool of claim 13, wherein the plurality of radial teeth comprise a plurality of ridges, wherein each ridge of the plurality of ridges comprise a flat circumferential profile.

17. The shaping tool of claim 16, wherein the plurality of ridges of the plurality of radial teeth of the annular calibration teeth comprise an axial height that is less than an axial height of a plurality of finished radial concavities of a plurality of finished face teeth.

18. A method for obtaining a finished face teeth on an inner ring of a wheel hub, the finished face teeth comprising a plurality of finished radial teeth having ridges with a first rounded circumferential profile and a plurality of concavities, the plurality of finished radial teeth alternating with the plurality of finished concavities, the inner ring being provided with an annular collar at a first extremity of the inner ring, the annular collar having a predetermined radial profile, the method comprising:
 forming, on the annular collar, annular roughed-out face teeth, the annular rouged-out face teeth formed coaxial with an axis of symmetry (A) of the annular collar, wherein the axis (A) coincides with an axis of symmetry (B) of the wheel hub, the annular roughed out face teeth comprising:
  a plurality of first radial teeth having ridges and arranged annularly, and
  a plurality of first radial concavities alternating annularly with the plurality of first radial teeth; and
 calibrating the annular roughed-out face teeth with a shaping tool, the shaping tool comprising a pressing head having an annular calibration facing teeth, wherein the shaping tool is pressed against the annular roughed-out face teeth of the annular collar with a predetermined axial force (F), engaging the annular calibration facing teeth with the annular roughed-out face teeth to form the finished face teeth,
 wherein the pressing head remains coaxial with the axis (A) when pressed against the annular collar,
 wherein the annular calibration teeth of the pressing head comprise;
  a plurality of second radial teeth arranged annularly; and
  alternating annularly with a plurality of second radial concavities, the plurality of second radial concavities delimited by a respective plurality of bottom wall comprising a second rounded circumferential profile that mirrors the first rounded circumferential profile of the ridges of the plurality of finished radial teeth of the finished face teeth,
 wherein the ridges of the plurality of first radial teeth comprise a flat circumferential profile,
 wherein the plurality of first radial concavities comprise a third rounded circumferential profile identical to the first rounded circumferential profile,
 wherein the plurality of annular calibration teeth press against a respective plurality of opposing flanks of the plurality of first radial teeth and cause a metal material of the plurality of annular roughed-out teeth to flow into the plurality of second radial concavities and against the respective plurality of bottom walls,
 wherein the ridges of the plurality of second radial teeth comprise a flat circumferential profile,
 wherein the plurality of second radial teeth comprise an axial height less than an axial height of the plurality of first radial teeth.

\* \* \* \* \*